US 6,861,469 B2

United States Patent
Diener et al.

(10) Patent No.: US 6,861,469 B2
(45) Date of Patent: Mar. 1, 2005

(54) WATER-IN-OIL POLYMER DISPERSIONS WITH IMPROVED ENVIRONMENTAL COMPATIBILITY

(75) Inventors: Bernd Diener, Krefeld (DE); Veronika Gehler, Krefeld (DE); Erich Küster, Krefeld (DE); Daniel Roulands, Krefeld (DE); Dieter Werhahn, Willich (DE)

(73) Assignee: Stockhausen GmbH & Co. KG, Krefeld (DE)

( * ) Notice: Subject to any disclaimer, the term of this patent is extended or adjusted under 35 U.S.C. 154(b) by 0 days.

(21) Appl. No.: 10/344,695

(22) PCT Filed: Aug. 8, 2001

(86) PCT No.: PCT/EP01/09153

§ 371 (c)(1),
(2), (4) Date: Feb. 24, 2003

(87) PCT Pub. No.: WO02/16446

PCT Pub. Date: Feb. 28, 2002

(65) Prior Publication Data

US 2003/0176547 A1 Sep. 18, 2003

(30) Foreign Application Priority Data

Aug. 23, 2000 (DE) .......................................... 100 41 393

(51) Int. Cl.⁷ .................................................. C08F 6/00

(52) U.S. Cl. ....................... 524/801; 522/903; 524/814; 524/829; 524/831; 524/832; 526/71

(58) Field of Search .......................... 522/903; 524/801, 524/814, 829, 831, 832; 526/71

(56) References Cited

U.S. PATENT DOCUMENTS

| 3,755,280 A | | 8/1973 | Saunders |
| 4,929,717 A | | 5/1990 | Chmelir |
| 5,280,092 A | * | 1/1994 | Chuang ..................... 526/201 |

FOREIGN PATENT DOCUMENTS

| DE | 41 11 334 | 5/1992 |
| DE | 41 41 981 | 6/1993 |
| DE | 43 13 085 | 10/1994 |
| EP | 0 228 397 | 7/1987 |
| EP | 1 024 152 | 8/2000 |

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

The invention relates to water-in-oil polymer dispersions consisting of a continuous organic phase and water-soluble polymers finely distributed therein, wherein said polymers have a radical monomer content of less than 1,000 ppm. The invention also relates to a method for producing the inventive polymer dispersions and to their use of flocculation auxiliary agents, thickening agents and as additives for phytosanitary and anti-erosion agents.

22 Claims, No Drawings

WATER-IN-OIL POLYMER DISPERSIONS WITH IMPROVED ENVIRONMENTAL COMPATIBILITY

The present invention relates to water-in-oil polymer dispersions consisting of a continuous organic phase and water-soluble polymers finely distributed therein, whereby said polymer dispersions have a residual monomer content of less than 1000 ppm. The present invention also relates to a method for producing the polymer dispersions according to the invention and to their use as flocculation auxiliary agents, thickening agents and as additives for phytosanitary and anti-erosion agents.

Water-in-oil polymer dispersions containing water-soluble homopolymers and copolymers are already widely used today, for example as flocculation agents in the sedimentation of solids, in particular in water and process water treatment or effluent treatment, in raw material extraction, chiefly of coal, aluminum and petroleum, or as auxiliary agents in paper production and in the sugar industry. Since in certain areas of application, for example use as additives for phytosanitary or anti-erosion agents, these polymer dispersions are frequently used in the open environment, an ever-increasing importance is being attached to the toxicological properties of such dispersions, whereby the products according to the prior art are often found wanting.

The object of the present invention is therefore to provide water-in-oil polymer dispersions that in comparison to products according to the prior art are more environmentally compatible and can be used for example as flocculation auxiliary agents, thickening agents, additives for anti-erosion and phytosanitary agents or together with other biologically active agents.

The object is achieved according to the invention by the provision of water-in-oil polymer dispersions consisting of a continuous organic phase that is practically immiscible with water, and water-soluble polymers and optionally auxiliary agents finely distributed therein, whereby the polymer dispersions have a residual monomer content of less than 1000 ppm, preferably less than 500 ppm and particularly preferably less than 300 ppm.

A water-in-oil polymer dispersion within the meaning of the invention includes both a polymer emulsion and a polymer suspension, such as are described for example in Ullmann's Encyclopedia of Industrial Chemistry, 1988, Vol. A11, page 254, which is hereby introduced as a reference and is thus regarded as part of the disclosure.

Residual monomers within the meaning of the present invention are understood to be the monomers used in a polymerisation reaction and not reacted during polymerisation, which are thus contained in the polymer dispersion in chemically unaltered form after polymerisation.

The polymers contained in the water-in-oil polymer dispersions according to the invention are a class of products that are preferably produced by reverse-phase emulsion polymerisation. In this method, finely dispersed water-soluble polymers are produced in a continuous organic phase that is practically immiscible with water by addition of water-in-oil emulsifiers.

In order to produce the polymers, the monomers are added to the organic phase as a monomer solution consisting of water and suitable monomers. According to the invention the aqueous monomer solution contains at least one polymerisable hydrophilic monomer. Said solution can however also consist of a mixture of two or more monomers from the group of hydrophilic monomers.

Hydrophilic, preferably water-soluble monomers are for example olefinic unsaturated carboxylic acids and carboxylic acid anhydrides, in particular acrylic acid, methacrylic acid, itaconic acid, crotonic acid, glutaconic acid, maleic acid and maleic acid anhydride and the water-soluble salts thereof, olefinic unsaturated sulphonic acids, in particular aliphatic or aromatic vinyl sulphonic acids, such as vinyl sulphonic acid, allyl sulphonic acid, styrene sulphonic acid, in particular acrylic and methacrylic sulphonic acids, such as sulphoethyl acrylate, sulphoethyl methacrylate, sulphopropyl acrylate, sulphopropyl methacrylate, 2-hydroxy-3-methacryloxypropyl sulphonic acid and 2-acrylamido-2-methylpropane sulphonic acid (AMPS) and the water-soluble salts thereof, and water-soluble or water-dispersible derivatives of acrylic and methacrylic acids, in particular acrylamide, methacrylamide, n-alkyl-substituted acrylamides, 2-hydroxyethyl acrylate, 2-hydroxyethyl methacrylate, hydroxypropyl acrylate, hydroxypropyl methacrylate, a $C_1$–$C_4$ alkyl (meth)acrylate and vinyl acetate.

As monomers, the monomer solution preferably contains acrylic acid and/or an acrylic acid derivative, particularly preferably at least one salt of acrylic acid and/or acrylamide and most particularly preferably a mixture of acrylic acid, at least one salt of acrylic acid, acrylamide and a salt of 2-acrylamido-2-methylpropane sulphonic acid.

In order to produce the monomer-containing water-in-oil emulsion, the monomer solution is added to an organic phase containing a water-in-oil emulsifier. In principle all substances known to the person skilled in the art for a reverse emulsion polymerisation can be used as the organic phase, preferably aliphatic hydrocarbons.

In a preferred embodiment of this invention, fatty acid esters are used as the organic phase. Esters of linear saturated or unsaturated fatty acids, in particular fatty acids having an alkyl chain length of more than 11 carbon atoms, preferably lauric, myristic, palmitic, stearic and oleic acid, with alcohols are particularly preferably used. Short-chain alcohols, preferably $C_1$–$C_4$ alcohols, are preferably used as the alcohol component. Higher, single-branched alcohols, preferably produced by a Guerbet synthesis, are also preferred. The use of these substances produces water-in-oil polymer dispersions displaying very low daphnia toxicity, measured according to OECD Guideline 202.

The fatty acid esters are used alone or preferably in combination with a hydrocarbon or a mixture of hydrocarbons, whereby the hydrocarbon or the mixture of hydrocarbons displays a boiling point below 200° C. So-called white oils from petroleum distillation or ligroin with a boiling range of 150–200° C. are most particularly preferably used for this purpose.

The organic phase is preferably used in a quantity of 20 to 80 wt. %, relative to the quantity of dispersion.

As emulsifier, 0.5 to 10 wt. %, relative to the quantity of dispersion, of at least one oil-soluble emulsifier are added to the organic phase. W/O emulsifiers are preferably used. Sorbitan esters, phthalic acid esters, fatty acid glycerides and ethoxylated derivatives thereof in combination with W/O emulsifiers are particularly preferably used. Polymeric emulsifiers with the trade name Hypermer® (ICI, London, England) are most particularly preferably used.

On completion of polymerisation, a residual monomer destructor is preferably added to the polymer dispersion. The addition is measured in such a way that the content of residual monomers in the resulting water-in-oil polymer dispersion is less than 1000 ppm, preferably less than 500 ppm and particularly preferably less than 300 ppm.

Residual monomer destructors within the meaning of the present invention are substances that modify polymerisable monomers by means of a chemical reaction in such a way that they are no longer polymerisable, such that within the meaning of the present invention they are no longer monomers. Substances that react with the double bond present in the monomers and/or substances that can initiate a more extensive polymerisation can be used for this purpose.

As residual monomer destructors that react with the double bond, reducing agents can for example be used, preferably substances from the group of acids and neutral salts of acids derived from sulphur having an oxidation number lower than VI, preferably sodium dithionite, sodium thiosulphate, sodium sulphite or sodium disulphite, and/or substances having a hydrogen sulphide group, preferably sodium hydrogen sulphide or compounds from the group of thiols, preferably mercaptoethanol, dodecyl mercaptan, thiopropionic acid or salts of thiopropionic acid or thiopropanesulphonic acid or salts of thiopropanesulphonic acid, and/or substances from the group of amines, preferably from the group of amines with low volatility, preferably diisopropanolamine or aminoethyl ethanolamine, and/or substances from the group comprising Bunte salts, formamidine sulphinic acid, sulphur dioxide, aqueous and organic solutions of sulphur dioxide or thio urea.

The person skilled in the art will recognise that a mixture of at least two residual monomer destructors from one or more groups can also be used.

In order to reduce the residual monomer content by a newly initiated polymerisation, the aforementioned reducing agents can be used alone or in combination with oxidising agents, by preference substances from the group of peroxodisulphates or hydroperoxides, preferably hydrogen peroxide. Also suitable are compounds that break down into radicals at elevated temperature, such as by preference substances from the group of azo compounds, peroxides or peroxodisulphates.

100 to 20,000 ppm of residual monomer destructors are added to the polymer dispersion by preference, preferably 200 to 5000 ppm and particularly preferably 500 to 3000.

An oil-in-water emulsifier described as an activator or inverter is then added to the water-in-oil polymer dispersion in a quantity of 0.5 to 10 wt. %, relative to the amount of emulsion. Ethoxylated fatty alcohols are used as inverters by preference, preferably ethoxylated fatty alcohols produced from linear and/or branched fatty alcohols having an alkyl chain length of more than 11 carbon atoms. Also preferred are ethoxylation products of highly branched alcohols, which are accessible via oxosynthesis, such as by preference isotridecyl alcohol. An ethoxylation product of higher, single-branched alcohols obtainable by Guerbet synthesis is particularly preferably used as an inverter.

The water-in-oil polymer dispersion according to the invention preferably contains 10 to 70 wt. %, particularly preferably 20 to 50 wt. % and most particularly preferably 25 to 40 wt. %, of water-soluble polymer particles.

The polymer particles preferably display a particle size of below 2 μm, and particularly preferably a particle size of below 1μm.

The water-in-oil polymer dispersions according to the invention containing water-soluble polymers are characterised by comparison to those according to the prior art by an improved environmental compatibility, in particular by a lower toxicity to micro-organisms. In particular they display an $EC_{50}$ value determined by the alga test according to OECD Guideline 201 of over 10 mg/l. In addition, $EC_{50}$ values of over 10 mg/l are obtained in some cases in the daphnia test according to OECD Guideline 202, such that under European law the dispersions according to the invention are classified only as "harmful to aquatic organisms". There is no requirement for them to be labelled with the hazard symbol "N".

Thanks to this improved environmental compatibility, the polymer dispersions according to the invention are particularly suitable from an ecological perspective for use in the open environment.

The present invention also provides a method for producing the water-in-oil polymer dispersions according to the invention by reverse-phase emulsion polymerisation, preferably using one or more fatty acid esters as the organic phase, whereby a residual monomer destructor is added to the polymer dispersion after polymerisation.

Polymerisation is initiated by addition of polymerisation initiators known to the person skilled in the art. Azo compounds, peroxide compounds or redox catalysts, either alone or in combination with one another, in a quantity of 0.001 to 5 wt. % relative to the quantity of monomer solution, are preferably used for this purpose.

Polymerisation is performed adiabatically, isothermally or as a combination of an adiabatic and isothermal process.

If performed as an isothermal operation, polymerisation is initiated at a certain temperature under reduced pressure, as described for example in EP 228 397 B1. This specification is hereby introduced as a reference and is regarded as part of the disclosure. The reduced pressure is set such that the heat of polymerisation that is generated causes volatile substances, such as water and constituents of the organic phase, to be distilled off and the temperature can be kept virtually constant. The end of polymerisation is characterised by the fact that no more distillate is converted. According to the invention the aforementioned residual monomer destructors are added to the polymer dispersion after polymerisation. Since on completion of the reaction the polymer dispersion is free from oxygen, reduction of the amount of residual monomers after addition of the residual monomer destructors is particularly effective in this process. 100 to 20,000 ppm of residual monomer destructors, relative to the dispersion, are used by preference, preferably 200 to 5000 ppm and particularly preferably 500 to 3000 ppm.

Similarly to the isothermal process, the adiabatic process is initiated at a certain temperature in the range from 0 to 50° C., preferably 0 to 25° C. Polymerisation is performed at atmospheric pressure with no external supply of heat, however, until a maximum final dispersion temperature, which depends on the content of polymerisable substance in the dispersion, is reached due to the heat of polymerisation. On completion of polymerisation the reaction mixture is cooled, in the course of which the residual monomer destructor is added. Since no oxygen-free dispersions are obtained with this operation, larger amounts of residual monomer destructor must be added. 100 to 20,000 ppm of residual monomer destructors are added in this operation by preference, preferably 500 to 5000 ppm.

Polymerisation can also be performed as a combination of an isothermal and an adiabatic process component. Such a process is preferably initially performed isothermally. At a predetermined moment the apparatus is aerated with inert gas and polymerisation is continued adiabatically to a fixed final temperature. The batch is then cooled to a preselected temperature under reduced pressure while being distilled. This operation produces an oxygen-free polymer dispersion, which means that reduction of the amount of residual monomers following addition of the residual monomer destructors is particularly effective. 100 to 20,000 ppm of residual monomer destructors, relative to the dispersion, are used by preference, preferably 200 to 5000 ppm and particularly preferably 500 to 3000 ppm.

An O/W emulsifier, also described as an activator or inverter, is then added to the dispersion in a quantity of 0.5 to 10 wt. %, relative to the amount of dispersion. Ethoxylated fatty alcohols are used as the inverter by preference, preferably ethoxylated fatty alcohols produced from linear and/or branched fatty alcohols having an alkyl chain length of more than 11 carbon atoms. Also preferred are ethoxylation products of highly branched alcohols, which are accessible by oxosynthesis, such as preferably isotridecyl alcohol. An ethoxylation product of higher, single-branched alcohols, which are accessible by Guerbet synthesis, is particularly preferably used as the inverter.

In comparison to the methods according to the prior art, more environmentally compatible water-in-oil polymer dispersions containing water-soluble polymers can be produced by the method according to the invention. Using the method according to the invention, polymer dispersions can be obtained that display $EC_{50}$ values of over 10 mg/l according to the alga test as defined in OECD Guideline 201. In some cases $EC_{50}$ values of over 10 mg/l are also obtained in the daphnia test according to OECD Guideline 202, such that under European law the polymer dispersions according to the invention are classified only as "harmful to aquatic organisms" and there is no requirement for them to be labelled with the hazard symbol "N".

The water-in-oil polymer dispersions according to the invention can be used for numerous areas of application. They are preferably used as flocculation auxiliary agents, particularly preferably for iron separation in the Bayer process, in mining for the processing of coal and ore and in the sugar industry. They can also particularly preferably be used as flocculation auxiliary agents in effluent treatment, most particularly preferably in combination with an additional flocculation auxiliary agent in the process known as dual flocculation.

The water-in-oil polymer dispersions according to the invention can also preferably be used as thickening agents or as additives for phytosanitary agents, with other biologically active agents or anti-erosion agents.

Test Methods

Toxicity to micro-organisms was determined in accordance with the OECD "Guidelines for Testing of Chemicals".

Specifically these are OECD Guideline 201, "Alga, Growth Inhibition Test" and OECD Guideline 202, "Daphnia sp., Acute Immobilisation Test and Reproduction Test" Part 1:

EXAMPLES

The invention is explained below with examples. These explanations are by way of example only and do not restrict the general concepts of the invention.

The following abbreviations are used:

| | |
|---|---|
| ABAH | 2,2'-azo-bis-amidinopropane dihydrochloride |
| AIBN | 2,2'-azo-bis-methylpropionitrile (2,2'-azo-bis-isobutyronitrile) |
| AMPS | 2-acrylamido-2-methylpropane suiphonic acid |
| BO | 2-butyl octanol |
| EO | ethylene oxide (1,2-epoxyethane) |
| IHD | isohexadecane |
| ITDA | isotridecyl alcohol |
| ITS | isotridecyl stearate |
| OFABOE | oil fatty acid butyl octyl ester |
| ROFAME | rapeseed oil faffy acid methyl ester |

Comparative Example 1

First of all an aqueous monomer solution is produced from the following components:
   457.0 g water
   84 g AMPS, sodium salt, 50% solution
   220 g acrylamide, 50% solution
   320 g acrylic acid
   320 g sodium hydroxide solution, 50% solution
   3.0 g formic acid, 85%
   1.0 ml Versenex® 80
   0.5 g ABAH
   30 g Hypermer® 1083 are then dissolved in 180 g ROFAME and 300 g isotridecyl stearate and the aqueous monomer solution is added with stirring. After formation of the emulsion said emulsion is homogenised with a high-speed domestic mixer and freed from dissolved oxygen by blowing out with nitrogen. Polymerisation is initiated at 20° C. by addition of 2 ml of a 0.2% tert.-butyl hydroperoxide solution and 2.4 ml sulphur dioxide gas, whereby the batch is heated to around 100° C. by the heat of polymerisation that is generated. After cooling, 80 g isotridecyl alcohol-6-ethoxylate are stirred in.

The results of the toxicity tests for daphnia and algae are set out in Table 1.

EXAMPLES 1 TO 12

Comparative Examples 2 and 3

In these examples water-in-oil polymer dispersions are produced by the polymerisation method ("operation") indicated in Table 1, whereby "i" denotes isothermal and "a" adiabatic. For the adiabatic and isothermal polymerisation methods the formulations described below are used.

General Formulation for Adiabatic Polymerisation (Operation "a")

First of all an aqueous monomer solution is produced from the following components:
   485.0 g water
   78 g AMPS, sodium salt, 50% solution
   203.5 g acrylamide, 50% solution
   297 g acrylic acid
   297 g sodium hydroxide solution, 50% solution
      3.0 g formic acid, 85%
      1.0 ml Versenex® 80
      0.5 g ABAH
   30 g Hypermer® 1083 are then dissolved in 480 g organic phase and the aqueous monomer solution is added with stirring. After formation of the emulsion said emulsion is homogenised with a high-speed domestic mixer and freed from dissolved oxygen by blowing out with nitrogen. Polymerisation is initiated at 20° C. by addition of 2 ml of a 0.2% tert.-butyl hydroperoxide solution and 2.4 ml sulphur dioxide gas, whereby the batch is heated to around 100° C. by the heat of polymerisation that is generated. On reaching the peak temperature the polymer dispersion is cooled down to around 40° C. by vacuum distillation.

In the case of the examples according to the invention, 40 g feeding liquor (SO2 in Exxsol 100 or $Na_2SO_3$ solution) are then absorbed under vacuum for the purposes of residual monomer reduction and 4% activator is stirred in following final cooling.

General Formulation for Isothermal Polymerisation (Operation "i")

First of all an aqueous monomer solution is produced from the following components:

500.0 g water 72.0 g AMPS, sodium salt, 50% solution 186.0 g acrylamide, 50% solution 272.0 g acrylic acid 211.0 g sodium hydroxide solution, 50% solution 3.0 g formic acid, 85%

1.0 ml Versenex® 80

0.5 g ABAH 40 g Hypermer® 1083 are then dissolved in 440 g organic phase and the aqueous monomer solution is added with stirring. After formation of the emulsion said emulsion is homogenised with a high-speed domestic mixer and heated to 60° C. 0.3 g AIBN are then added and vacuum is applied. Water is distilled off until the batch is free from oxygen and polymerisation begins. The reaction temperature is kept constant in a range from 60–65° C. by the vacuum distillation. After around 90 ml of water has been distilled, the connection to the vacuum pump is closed and the apparatus is aerated with nitrogen until normal pressure is reached. The batch is then heated to around 90° C. by the residual heat of polymerisation.

On reaching the peak temperature the polymer dispersion is cooled down to around 40° C. by further vacuum distillation.

In the case of the examples according to the invention, 40 g feeding liquor ($SO_2$ in Exxsol 100 or $Na_2SO_3$ solution) are then absorbed under vacuum for the purposes of residual monomer reduction and 4% activator is stirred in following final cooling.

The individual substances for the organic phase, the activator and the feeding liquor, along with the results of the toxicity tests for daphnia and algae, are set out in Table 1.

What is claimed is:

1. A water-in-oil polymer dispersion, comprising a continuous organic phase comprising 20 to 80 wt % of a fatty acid ester that is practically immiscible with water, and a water-soluble polymer, and optionally one or more auxiliary agents finely distributed therein, and wherein said dispersion has a residual monomer content of less than 1000 ppm.

2. The water-in-oil polymer dispersion according to claim 1, wherein said dispersion comprises:
   A) 10 to 70 wt. % of a water-soluble polymer,
   B) 0.5 to 10 wt. % of water-in-oil emulsifier,
   C) 100 to 20,000 ppm of a residual monomer destructor,
   D) 0.5 to 10 wt. % of an inverter, and
   E) water to make up to 100 wt. %.

3. The water-in-oil polymer dispersion according to claim 1, wherein the fatty acid ester 4 comprises linear saturated and unsaturated fatty acids, having an alkyl chain length of more than 11 carbon atoms, and of $C_1$–$C_4$ alcohols or higher, unbranched alcohols; or a mixture of at least two of these esters.

4. The water-in-oil polymer dispersion according to claim 3, wherein the fatty acid ester or the fatty acid esters are mixed with a hydrocarbon or a mixture of hydrocarbons, and wherein the boiling point of the hydrocarbon or of the mixture of hydrocarbons is below 200° C.

5. The water-in-oil polymer dispersion according to claim 1, wherein the polymer comprises a polymer of acrylic acid and/or at let one acrylic acid derivative.

6. The water-in-oil polymer dispersion according to claim 1, wherein the polymer comprises a polymer of at least one salt of acrylic acid and acrylamide.

7. The water-in-oil polymer dispersion according to claim 1, wherein the polymer comprises a polymer of acrylic acid and/or a salt foacrylic acid, acrylamide and a salt of 2-acrylamido-2-methylpropane sulphonic acid.

8. The water-in-oil polymer dispersion according to claim 1, wherein the polymer is present as polymer particles with dimensions less than 2 μm.

9. The water-in-oil polymer dispersion according to claim 1, wherein said dispersion displays an $EC_{50}$ value determined, according t OECD Guideline 202, of over 10 mg/l.

10. The water-in-oil polymer dispersion according to claim 1, wherein said dispersion displays an EC50 value, determined according to OECD Guideline 201, of over 10 mg/l.

11. A method for producing a water-in-oil polymer dispersion according to claim 1, comprising polymerizing one

TABLE 1

| Example | Operation | Organic phase | Activator | Feeding liquor | Acrylic acid [ppm] | Daphnia toxicity | Algal toxicity |
|---|---|---|---|---|---|---|---|
| Comparative example 1 | a | ROFAME/ITS 3:5 | ITDA-5EO | — | 2,000 | 3.4 | 5.5 |
| Comparative example 2 | a | ITS | ITDA-5EO | — | 1,700 | 1.5 | 4.4 |
| Comparative example 3 | i | ROFAME/Shellsol D 40 18:7 | ITDA-5EO | — | 1,800 | 33 | 9.7 |
| Example 1 | a | ROFAME/ITS 3:5 | ITDA-5EO | 2% $SO_2$ in Exxsol 100 | 160 | 2.1 | 74 |
| Example 2 | a | ROFAME/ITS 3:5 | ITDA-5EO | 2% $Na_2SO_3$ solution | 260 | 1.5 | 62 |
| Example 3 | a | ROFAME/IHD 18:7 | ITDA-5EO | 2% $Na_2SO_3$ solution | 340 | <1 | 37 |
| Example 4 | i | ROFAME/Shellsol D 40 18:7 | ITDA-5EO | 5% $Na_2SO_3$ solution | 110 | 29 | 66 |
| Example 5 | a | ROFAME/Shellsol D 40 5:1 | ITDA-5EO | 2% $Na_2SO_3$ solution | 510 | 47 | 29 |
| Example 6 | i | ROFAME/Shellsol D 40 18:7 | ITDA-5EO | 2% $SO_2$ in Exxsol 100 | 360 | 37 | 37 |
| Example 7 | i | ROFAME/Shellsol D 40 18:7 | BO-5EO | 2% $Na_2SO_3$ solution | 510 | 64 | 80 |
| Example 8 | i | OFABOE/Shellsol D 40 18:7 | ITDA-5EO | 2% $Na_2SO_3$ solution | 730 | 36 | 18 | or more monomers by reverse-phase emulsion polymerization, and wherein a residual monomer destructor is added to the polymer after polymerization.

12. The method according to claim 11, wherein said residual monomer destructor is selected from substances from the group of acid and neutral salts of the acids derived from sulphur having an oxidation number below VI; substance having a hydrogen sulphide group; amines; Bunte salts; formamidine sulphinic acid; sulphur dioxide; aqueous and organic solutions of sulphur dioxide; thio urea or a mixture thereof.

13. The method according to claim 11, wherein said residual monomer destructor is used in a quantity of 100 to 20,000 ppm, relative to the dispersion.

14. A method of flocculating particles and/or solids in a medium, comprising adding an effective amount of the water-in-oil polymer dispersion according to claim 1, as a flocculation agent, to the medium.

15. A method of thickening a medium, comprising adding an effective amount of the water-in-oil polymer dispersion according to claim 1, as thickening agent, to the medium.

16. A method of performing of a medium, comprising adding an effective amount of the water-in-oil polymer dispersion according to claim 1, as an additive for a phytosanitary agent, optionally with one or more other biologically active agents, to the medium.

17. A method of reducing erosion of a medium, comprising adding an effective amount of the water-in-oil polymer dispersion according to claim 1, as an additive for an anti-erosion agent, to the medium.

18. The method of claim 14, wherein the medium comprises water.

19. The method of claim 14, wherein the particles and/or solids are selected from coal, aluminum or petroleum.

20. A method for producing paper, comprising adding an effective amount of the water-in-oil polymer dispersion according to claim 1, as an auxiliary agent, to one or more solvents used in paper production.

21. A method for producing sugar, comprising adding an effective amount of the water-in-oil polymer dispersion according to claim 1, as an auxiliary agent, to one or more solvents used in sugar production.

22. The method according to claim 12, wherein said residual monomer destructor is selected from sodium dithionite, sodium thiosulphate, sodium sulphite, sodium disulphite, sodium hydrogen sulphide, compounds from the group of thiols, mercaptoethanol, dodecyl mercaptan, thiopropionic acid, salts of thiopropionic acid, thiopropanesulphonic acid, salts of thiopropanesulphonic acid, amines with lop volatility, or a mixture thereof.

* * * * *